United States Patent [19]
Amann et al.

[11] 3,849,022
[45] Nov. 19, 1974

[54] TURBINE BLADE COOLANT DISTRIBUTOR

[75] Inventors: Charles A. Amann, Bloomfield Hills; James M. Ricketts, Oxford, both of Mich.

[73] Assignee: General Motors Corporation, Detroit, Mich.

[22] Filed: July 12, 1973

[21] Appl. No.: 378,648

[52] U.S. Cl................... 415/116, 415/117, 415/178
[51] Int. Cl.......... F02c 7/12, F02c 7/20, F01d 5/00
[58] Field of Search ........... 415/115, 116, 117, 178, 415/184; 60/39.51, 39.66, 39.32, 39.36

[56] References Cited
UNITED STATES PATENTS

| | | | |
|---|---|---|---|
| 2,625,793 | 1/1953 | Mierley | 415/115 |
| 3,256,689 | 6/1966 | Zeek | 60/39.66 |
| 3,628,880 | 12/1971 | Smoland et al. | 415/115 |

Primary Examiner—C. J. Husar
Assistant Examiner—Louis J. Casaregola
Attorney, Agent, or Firm—J. C. Evans

[57] ABSTRACT

A turbine vane tip cooling assembly including a scroll-shaped nozzle box supported by an internally located tube member on a first bulkhead, the scroll including an annular axial outlet located upstream of a gas generator turbine nozzle and a gas generator turbine supported on a second bulkhead with a continuous shroud ring; an annular coolant distribution ring on the nozzle box outlet introduces a thin annular film of coolant along the outer shroud of the gasifier turbine nozzle and through the gasifier turbine to immerse thin rotor blade tips and the exposed surface of the shroud ring to maintain close running clearance between the blade tips and the shroud ring for increased turbine efficiency.

4 Claims, 6 Drawing Figures

TURBINE BLADE COOLANT DISTRIBUTOR

This invention relates to turbine cooling systems for gas turbine engines and more particularly to means for directing coolant across the thin blade section of rotor blades and the exposed surface of a rotor blade shroud ring so as to maintain a controlled clearance therebetween.

In typical axial flow turbines used in the gas generator section of a gas turbine engine, combustion gas flowing through the thin rotor blade tip sections of the turbine have less efficiency than the combustion gas that flows through the mid-span region of the blades because of boundary layer buildup and excessive clearance between the rotor shroud ring and the tips of the rotor blades.

In U.S. Pat. No. 3,628,880, a gas generator turbine nozzle is modified to include a complex arrangement of passages and holes to direct coolant throughout the vertical profile of an annular row of turbine blades on a turbine rotor that is driven by gas flow therethrough. To minimize mixing and momentum losses within the combustion gas stream passing into the gas generator turbine nozzle, and coolant outlets are arranged at specific efflux angles which must be carefully controlled.

An object of the present invention is to improve the control of blade tip clearance between a gas generator turbine wheel and an inner surface of a rotor shroud ring by the provision of means for directing a continuous annular flow of coolant that will persist as an annular ring of coolant through the turbine nozzle and across thin tip sections of an annular row of turbine blades and the inner surface of a rotor shroud ring for cooling the vane tips and shroud ring to control clearance therebetween and wherein the annular continuous flow of coolant is directed into the inlet of the turbine nozzle for flow thereacross without mixing or changing the momentum of combustion gas flow through an axial outlet into the turbine nozzle and across the annular row of turbine blades.

Another object of the present invention is to improve distribution of coolant to thin tip sections of turbine blades on the turbine wheel of a gas generator to maintain a close clearance between the blade tips and a stationary rotor shroud ring that is supported on an outer shroud segment of the gas generator turbine nozzle, by the provision of a scroll-shaped sheet metal nozzle box cantilevered on a forward bulkhead to locate an axial annular outlet thereof with respect to the inlet of a gas generator turbine nozzle and wherein a gas tight ring is located on the outer surface of the annular outlet and configured to produce a thin continuous annular film of coolant flow which is directed across the inner surface of the outer shroud of the turbine nozzle and the inner surface of a rotor shroud ring and thin tip sections of an annular row of turbine rotor blades with the ring directing coolant through the aforesaid sections without mixing or altering the momentum of the primary flow pattern of combustion gases directed through the annular outlet.

Further objects and advantages of the present invention will be apparent from the following description, reference being had to the accompanying drawings wherein a preferred embodiment of the present invention is clearly shown.

Figure 1:
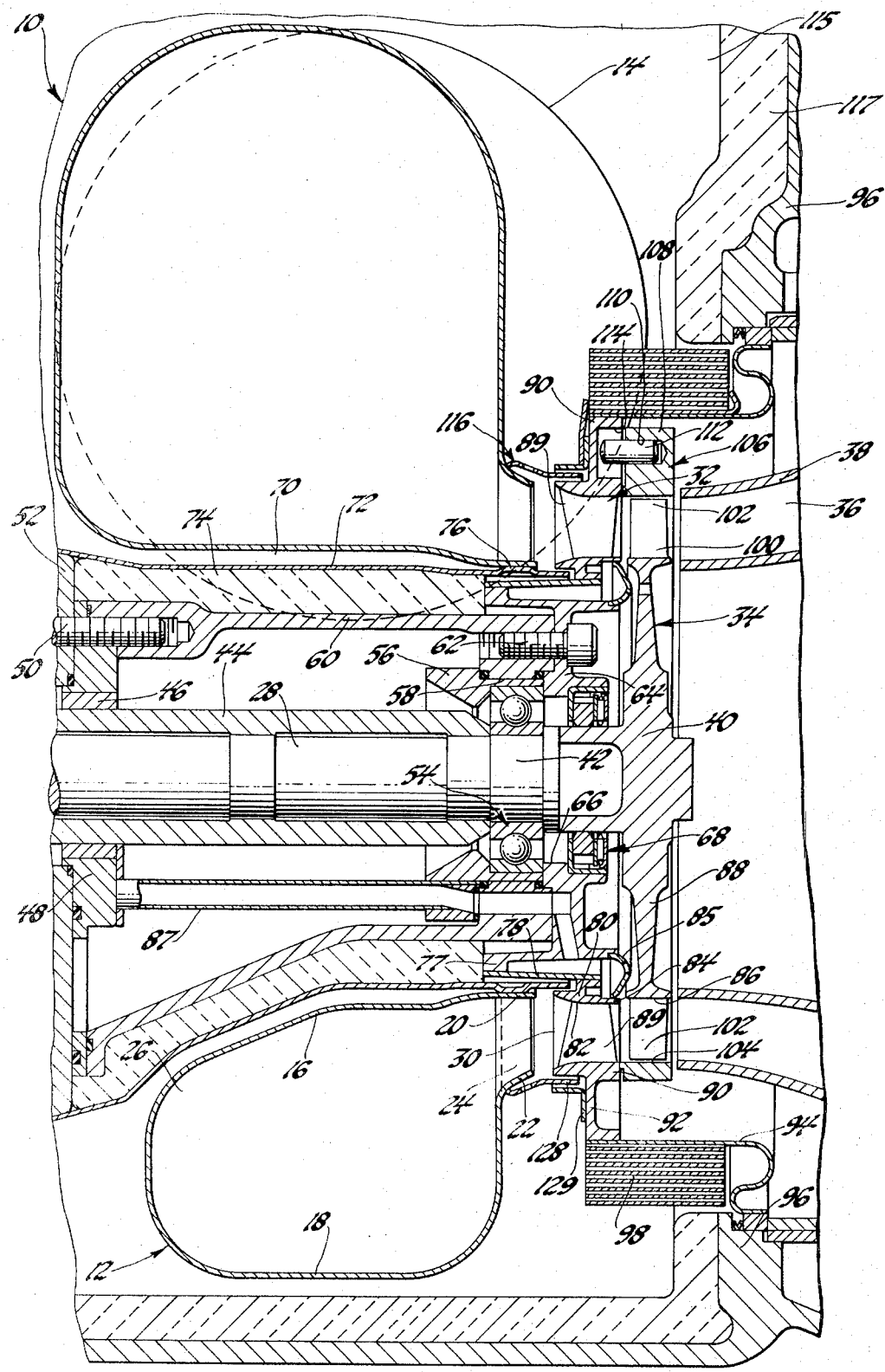
FIG. 1 is a partial sectional view of a gas turbine taken on a plane containing the axis of rotation of the turbine rotor.
Figure 1A:
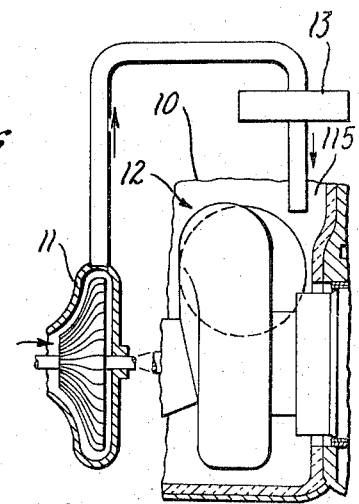
FIG. 1a is a diagrammatic view of compressor and regenerator components of the turbine in FIG. 1.
Figure 2:
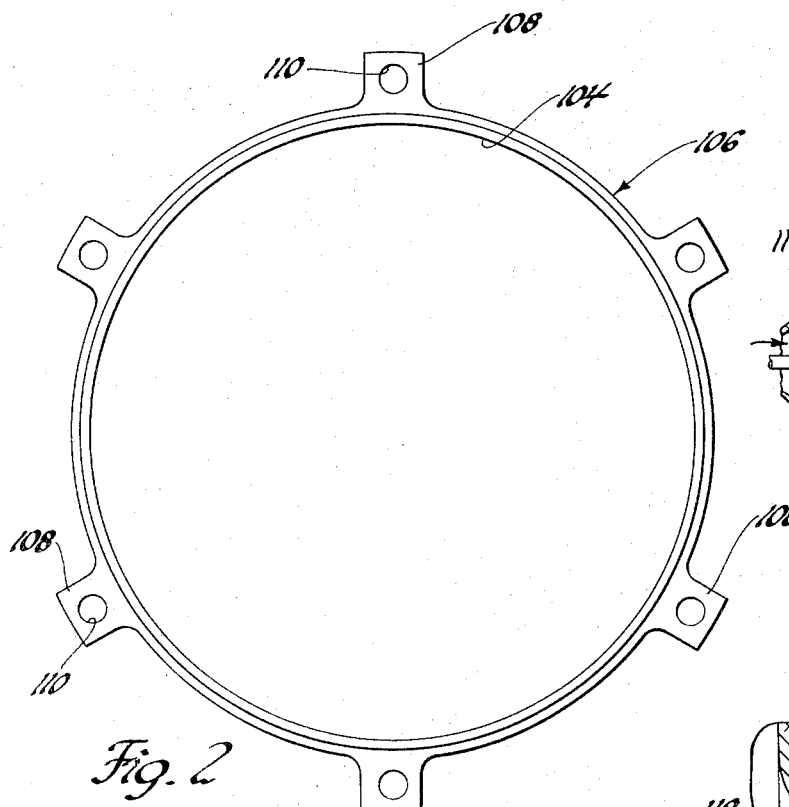
FIG. 2 is an end elevational view of a rotor shroud ring in the assembly of FIG. 1.

Referring now to the drawings, FIG. 1 illustrates a gas generator assembly 10 for a gas turbine engine. As shown in FIG. 1a the engine includes a compressor 11 for supplying air across a regenerator 13 from whence air is directed into a chamber 115 for supply to conventional turbine combustion apparatus (not hown). The combustion products are directed to a nozzle box 12 having an inlet 14 shown in outline on FIG. 1 adapted to be connected to the outlet of a gas turbine combustion chamber.

The nozzle box 12 is formed as a scroll from inlet 14 and includes an inner wall portion 16 and an outer wall portion 18 that have edge portions 20, 22 thereon respectively defining an annular outler 24 from the chamber 26 of the scroll. The annular outlet 24 is located radially outwardly of the axis of rotation of a turbine drive shaft 28 to discharge hot combustion gas from the scroll chamber 26 into the inlet 30 of a gas generator turbine nozzle 32. The gas generator turbine nozzle 32 directs the combustion gases across a turbine wheel 34 of the gas generator for discharge through an annular passageway 36 in an exhaust gas housing 38.

More particularly, the turbine wheel assembly 34 includes a central hub 40 connected to the inboard end 42 of drive shaft 28. The drive shaft 28 is directed through a bearing housing 44 supported by a sleeve bearing 46 at one end thereof within a bearing block 48 secured by suitable means such as a bolt 50 to a gas turbine bulkhead 52. The inboard end 42 of the shaft 28 is supported by a bearing assembly 54 journalled in a bearing ring 56 that is supported within a bore 58 in one end of a shaft housing 60 connected at the outboard end thereof by the bolts 50 to the bulkhead 52. The inboard end of the shaft housing 60 is connected by means of bolts 62 to a central disk 64 of the gas generator turbine nozzle 32. It includes a central bore 66 therein in which is located a seal assembly 68 for sealing against gas leakage from the gasifier through the housing 60.

Figure 3:
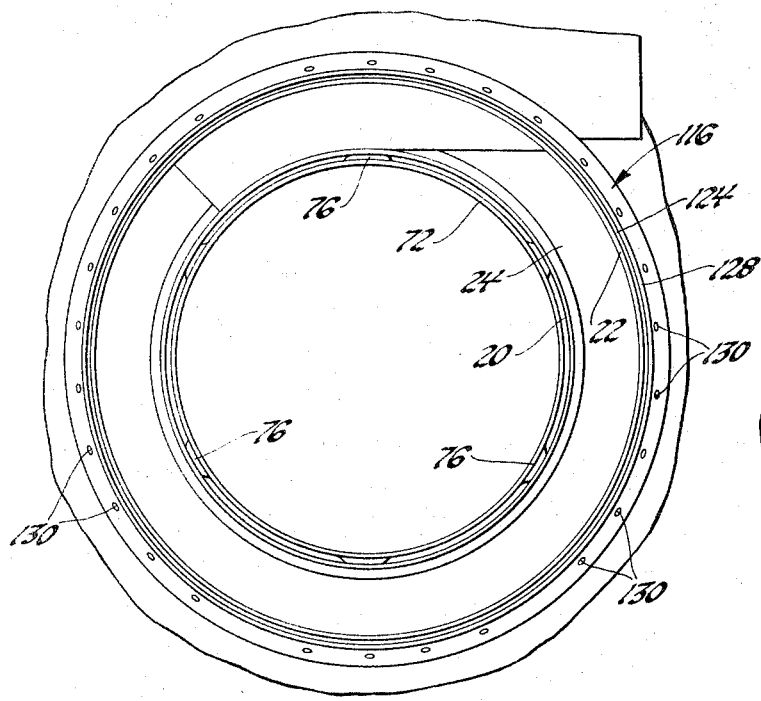
FIG. 3 is an end elevational view of a nozzle box, nozzle box support and coolant distribution ring subassembly in the present invention.

The sheet metal nozzle box 12 has an axial opening 70 formed through the inner wall 16 thereof having a sheet metal tubular member 72 directed therethrough. The tubular member 72 is supported by the outer surface of a layer of insulating material 74 formed between the tubular member 72 and the shaft housing 60 through a predetermined portion of the circumferential extent thereof. It is supportingly received by the bulkhead 52 to serve as a cantilever support for the nozzle box 12. More particularly, the tubular member 72 includes a plurality of radially outwardly bent channel portions 76 at circumferentially spaced points on the inboard end thereof, each of which are welded to the inner surface of the free edge 20 of the inner wall 16 as best shown in FIG. 3. The member 72 thus supports the annular outlet 24 of the nozzle box 12 concentrically with respect to the axis of rotation of the shaft 28 at a point separate from the support for the gas generator turbine nozzle 32.

The gas generator turbine nozzle 32 includes an axial flange portion 77 on the central disc 64 thereof which is joined to an annular member 78 extending from a point axially forwardly of the edges 20, 22 of the outlet 24 to a point rearwardly thereof to form a flexible base support for an annular inner shroud 80 of the turbine nozzle 32 having a curved inner surface 82 extending from a point in line with the edge 20 to a trailing edge 84 that is in alignment with the outer circumference 86 of the rotor 88 of the turbine wheel assembly 34. A coolant distribution ring 85 fits between trailing edge 84 and flange 77 to direct coolant from tube 87 against the rotor 88. It is not welded at its outer edge so that edge 84 is free to expand.

An annular row of nozzle vanes 89 are connected to the inner shroud 80 and to an outer shroud 90 that has a flange 92 thereon connected to one end of a flexible bent sheet metal member 94 having the opposite end thereof connected to a rearward bulkhead 96.

The flexible sheet metal member 94 permits radial outward expansion of the turbine nozzle 32 and also serves as a support for an annular energy absorbing member 98 made up of corrugated sheet metal strip that serves to restrain radial outward movement of component parts of the turbine wheel assembly 34.

The turbine wheel assembly 34 includes an annular row of turbine blades 100 thereon each including a thin section radial outer tip portion 102 located in close spaced relationship with the inner periphery 104 of a separate continuous rotor shroud ring 106 having a plurality of radially outwardly directed lug portions 108 thereon each with a bore 110 therethrough which receives one end of a dowel pin 112 having the opposite end thereof located within a groove 114 formed on a radial outer portion of the outer shroud 90 of the gas generator turbine nozzle 32. Each of the grooves 114 has a predetermined radial extent to permit thermal expansion of the rotor shroud ring 106 with respect to the turbine nozzle. The slots 114, have a width corresponding to the diameter of the dowel pins 112 to secure the shroud ring against rotation with respect to shroud 90.

The turbine nozzle 32 and rotor shroud ring 106 are thereby supported with respect to the bulkhead 96 for free radial expansion with respect thereto and are separate from the structural support for the nozzle box 12 which freely expands on the cantilever support defined by the sheet metal tubular member 72 within a regenerator outlet air chamber 115 defined in part by the rear bulkhead 96 and the front bulkhead 52. The rear bulkhead 96 is covered by a layer of thermally insulating material 117 to isolate the chamber 115 from the exhaust side of the assembly. The chamber 115 more particularly is in communication with a regenerator air outlet of the type shown in U.S. Pat. No. 3,256,689. The fluid flow from the regenerator outlet is at a temperature reduced from that of combustion gases flowing from the annular outlet 24 and has a predetermined pressure for directing the regenerator air into the combustion chamber of a gas turbine. The temperature of the regenerator air constitutes a source of coolant fluid capable of maintaining components parts of the gas turbine gas generator at a predetermined temperature range for controlling the relative dimensional relationship between certain component parts thereof when cold and heated.

Figure 4:
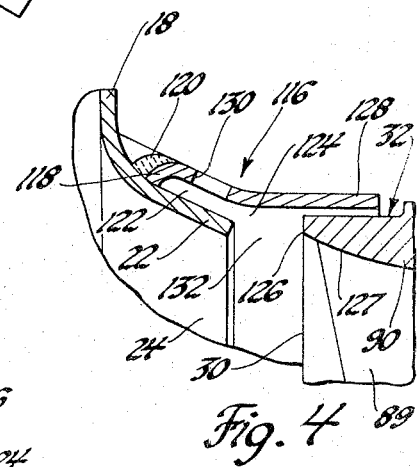
FIG. 4 is a fragmentary sectional view showing the relationship of a coolant distribution ring and the inlet of a gas generator turbine nozzle.

More particularly, in order to maintain turbine efficiency, it is desirable to locate the thin section turbine blades 102 in close spaced relationship with the inner surface 104 of the rotor shroud ring 106. In the embodiment of the invention illustrated in FIGS. 1 through 4, a gas tight ring 116 is formed continuously around the outlet 24 from the nozzle box 12. More particularly, it includes a forwardly located edge 118 thereon welded in gas tight relationship at 120 around the circumference of the outer wall 18 of the nozzle box 12 forwardly of the edge 22 thereon to form an annular space or slot 122 therebetween which forms a closely spaced gap 124 continuously around the annular outlet 24 at a point radially outwardly therefrom. The gap 124 is located immediately adjacent the leading edge 126 of the turbine nozzle 32 in line with the inner surface 127 of the outer nozzle shroud 90 as is best seen in FIG. 4. The ring 116 has an extension 128 thereon located radially outwardly of and in overlying relationship to the outer surface of the outer shroud 90. An L-shaped annular flange 129 has one leg connected to shroud flange 92 and a rearwardly directed leg located radially outwardly of extension 128 to permit thermal expansion of extension 128 and to produce a restricted passage between chamber 115 and inlet 30 to prevent direct bypass of coolant therebetween.

Additionally, the ring 116 includes a plurality of holes 130 therein located circumferentially therearound adjacent the gas tight end 118 thereon to overlie the annular cavity 122. The holes 130 serve to communicate the regenerator air within chamber 115 with space 122. The regenerator outlet air will flow thereacross into the space 122 and form as a thin annular coolant stream which flows axially outwardly thereof across a limited gap 132 between the outlet edge 22 of the nozzle box 12 and the leading edge 126. The annular flow of coolant then will pass as a thin stream across the inner surface 127 of the outer shroud ring 90 from whence it passes as a thin stream across the region between the thin outer tips 102 of the turbine blades 100 and the inner surface 104 of the shroud ring 106. The flow pattern of the coolant from the ring 116 into the turbine nozzle and turbine wheel components of the gas generator will prevent undesirable mixing and turbulence in the gas combustion flow through the outlet 24. Furthermore, it will flow across the tips of the blades and the inner surface 104 to immerse the thin rotor blade tips in reduced temperature gas to enhance their durability as well as to bathe the exposed surface of the stationary shroud ring 106 surrounding the rotor to minimize its thermal expansion. As a result, a reduced running clearance can be maintained between the tips 102 and the exposed surface 104 of the shroud ring to maintain high turbine efficiency. The coolant supply is introduced by means of structure that does not interfere with free thermal expansion of the gas generator components and is characterized by the provision of a single ring formed in a manner to produce a fluid flow pattern that will not interfere with the primary combustion gas flow through the gas generator and does not require careful control of efflux angles into the hot combustion gas stream. Another benefit that accrues from the improved coolant gas distribution system provided by the ring 116 is that the rotor blade tips 102 are protected from overheating in the event of burner or fuel control malfunction. In this case, the flow of coolant from the regenerator air outlet is maintained and will keep the tips at a temperature during the malfunction conditions to avoid excessive temperature increases in the blades that can cause the thin tips to erode. In the embodiment of FIGS. 1 through 4, the air used for shroud cooling is first passed through the air side of the regenerator with regenerator outlet air entering chamber 115 for passage through holes 130.

Figure 5:
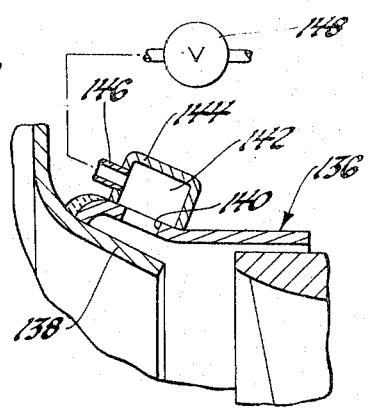
FIG. 5 is a fragmentary sectional view of another embodiment of a coolant ring and its relationship to a gas generator turbine nozzle.

Referring now to the embodiment of FIG. 5, a second embodiment of the invention is illustrated including a coolant distribution ring 136 which is located on the outer surface of the outer wall 138 of an axially formed annular outlet from a nozzle box of the type illustrated in the first embodiment. In this arrangement, the ring includes a first plurality of openings (not shown) of the type shown at 130 in the first embodiment that are in communication with the chamber of a gas generator which is in communication with the outlet air from the regenerator. A second plurality of openings 140 are provided therein which communicate with a manifold space 142 formed by a manifold member 144 that is sealed with respect to the ring 136 around the openings 140 therethrough. The manifold 144 is connected to a conduit 146 having a control valve 148 therein to draw air directly from the compressor discharge of a gas turbine to bypass air directly therefrom around the regenerator. Control of the valve 148 will regulate the amount of flow of air from the compressor discharge which is cooler than air from the regenerator air outlet. This enables the coolant temperature to be modulated to regulate the degree of cooling, as for example, in the event of overheating when a burner or fuel control malfunction occurs to reduce the temperature of coolant to further delay any temperature increase in the thin tip section of a gas turbine rotor blade to prevent damage to the blade tips.

While the embodiments of the present invention, as herein disclosed, constitute a preferred form, it is to be understood that other forms might be adopted.

What is claimed is as follows:

1. In a gas turbine engine having a gas generator including a turbine nozzle having an outer shroud and an inner shroud with a row of vanes connected therebetween for directing gas flow through turbine blades on a rotor wherein the gas flow is confined at the outer diameter of the rotor by a fixed rotor shroud ring connected to the outer shroud of the nozzle for free radial expansion with respect thereto the improvement comprising: means defining an air chamber, means for directing cooling air into said chamber, a nozzle box located in said air chamber having an inlet adapted to be connected to a combustion chamber outlet and having inner and outer walls thereof forming an annular outlet located coaxially of the inlet of the turbine nozzle, said annular outlet including a continuous ring thereon located axially forwardly of said outlet and having an extension thereon directed axially rearwardly of said outlet and located radially outwardly of the outer shroud of the turbine nozzle to define an annular slot directed axially of said outlet to a point adjacent the front edge of the outer shroud at the inner surface thereof, a plurality of circumferentially spaced openings in said ring in communication with said air chamber located axially forwardly of said outlet, said outer wall of said annular outlet overlying said openings to direct flow from said chamber through said slot to direct cooling air across the inner surface of said outer shroud for cooling the radial outermost tips of turbine blades and the exposed surface of the rotor shroud ring to maintain a predetermined clearance therebetween.

2. A turbine drive for a gas generator for use in a gas turbine engine comprising: a turbine including a shaft adapted to be connected to a compressor, a scroll-shaped nozzle box having an inlet adapted to be connected to combustion apparatus in a gas turbine engine and including an inner wall and an outer wall thereon defining an annular outlet located coaxially of said turbine shaft, a turbine nozzle having an inner shroud and an outer shroud with a plurality of vanes connected therebetween, said turbine nozzle including an inlet end thereof located axially of said annular outlet and including an outlet end, said turbine including a wheel having a radially outer rim thereon with a plurality of blades extending radially outwardly thereof, a continuous rotor shroud ring located radially outwardly of the tips of each of said blades, means for securing said rotor shroud ring on said outer shroud of said turbine nozzle against rotation with respect thereto and for axial movement relative thereto, said shroud ring having an inner surface thereon in close spaced relationship to the outer tips of said turbine blades, a gas-tight ring having one end thereof connected to said outer wall of said nozzle box continuously circumferentially around said annular outlet therefrom, said gas-tight ring having an axial extension thereon radially overlying the outer shroud of said nozzle, a plurality of openings in said gas-tight ring located radially outwardly of the outer wall of said annular outlet, said outer wall and said gas-tight ring thereby defining a smooth path for flow from said openings to the inlet of said nozzle, and housing means defining an air chamber in communication with a source of cooling air and in communication with said openings for directing cooling air therethrough to be directed thereby through said nozzle inlet across the inner surface of said upper shroud and the inner surface of said shroud ring for cooling the tips of said turbine blades and the inner surface of said shroud ring for controlling clearance therebetween.

3. In a gas turbine engine of the type including a compressor, a regenerator, and a turbine coupled to the compressor, these parts connected for flow of compressed gas from the compressor through the regenerator the improvement comprising: a turbine nozzle having an inner shroud and an outer shroud and a plurality of vanes connected therethrough defining a flow path for gas therethrough, a turbine wheel with radial blades thereon, a turbine rotor shroud ring located axially downstream of the outlet from said nozzle radially outwardly of said wheel, means for connecting said shroud ring to said outer shroud of said turbine nozzle against rotation with respect thereto and for free radial movement relative thereto, a scroll having an inlet adapted to be connected to the outlet of combustion apparatus and an inner wall and outer wall forming a continuous annular outlet from said scroll axially located with respect to the inlet of said turbine nozzle, said inner wall member forming an axial opening through said scroll, a tubular support member extending through said axial opening and having an inboard end thereon fixed to the inner wall to flexibly cantilever said scroll with respect to said tubular support member, means defining an air chamber to receive cooling air from the regenerator, a gas-tight ring connected to the outer wall of said scroll forwardly of said scroll outlet, said gas-tight ring having a first portion thereof spaced with respect to said outer wall and a second portion thereon extending axially outwardly of said scroll outlet into radial overlying relationship with the outer shroud of said nozzle to form an annular slot defining a smooth flow path to the inlet thereof adjacent the inner surface of the outer shroud, a plurality of openings in said gas-tight ring located circumferentially therearound for communicating said chamber with the annular slot to define a flow path for cooling air to the inlet edge of said turbine nozzle, said cooling air flowing across the inner surface of the outer shroud of said turbine nozzle and the inner surface of said shroud ring for cooling the outer tips of the turbine blades to maintain a predetermined clearance between the turbine blades and said turbine rotor shroud ring during passage of hot gas from aid scroll outlet through said turbine nozzle and said turbine wheel.

4. A turbine drive for a gas generator for use in a gas turbine engine comprising: a turbine including a shaft adapted to be connected to a compressor, a nozzle box scroll having an inlet adapted to be connected to the outlet of combustion apparatus in a gas turbine engine and including an outlet having an inner wall thereon and an outer wall thereon defining an annular outlet from said scroll located concentrically of said turbine shaft, a turbine nozzle having an inner shroud and an outer shroud with a plurality of vanes connected therebetween, said turbine nozzle including an inlet end thereof located axially of said annular outlet and including an outlet end thereon, said turbine including a wheel having a radially outer rim thereon with a plurality of blades extending radially outwardly thereof, a continuous turbine shroud ring located radially outwardly of the tips of each of said blades, means for securing said shroud ring on said outer shroud of said turbine nozzle against rotation with respect thereto and for axial movement relative thereto, said turbine shroud ring having an inner surface thereon in close spaced relationship to the outer tips of said blades, a gas-tight ring having one end thereof connected to said outer wall of said scroll continuously circumferentially around said outlet therefrom, said gas-tight ring having an axial extension thereon radially overlying the outer shroud of said nozzle, a plurality of openings in said gas-tight ring located radially outwardly of the outer wall at the outlet from said scroll, said outer wall of said scroll outlet and said gas-tight ring defining a flow directing slot for flow from said openings to the inlet of said nozzle, means defining a chamber to receive cooling air under pressure, said chamber being in communication with a first plurality of said openings for directing cooling air therethrough to be directed through said nozzle inlet across the inner surface of said upper shroud and the inner surface of said shroud ring and the tips of said rotor blades, means forming a passage adapted to be connected to the discharge of an air compressor in a gas turbine engine, manifold means for directing said discharge air through a second plurality of said openings, and valve means interposed between said passage and said manifold means operative to control gas flow from the discharge of the compressor into the manifold means for modulating the temperature of the cooling air flow across the flow directing surface into said nozzle and across the outer tips of said turbine blades for maintaining a blade tip temperature to control clearance between the blades and the inner surface of said rotor shroud ring.

* * * * *